United States Patent
Athad (10) Patent No.: US 12,275,078 B2
(45) Date of Patent: Apr. 15, 2025

(54) ROTATIONALLY ASYMMETRIC DOUBLE-ENDED GROOVING CUTTING INSERT, INSERT HOLDER AND CUTTING TOOL

(71) Applicant: ISCAR, LTD., Tefen (IL)

(72) Inventor: Shimon Athad, Maalot (IL)

(73) Assignee: Iscar, Ltd., Tefen (IL)

( * ) Notice: Subject to any disclaimer, the term of this patent is extended or adjusted under 35 U.S.C. 154(b) by 0 days.

(21) Appl. No.: 17/735,220

(22) Filed: May 3, 2022

(65) Prior Publication Data

US 2023/0356311 A1 Nov. 9, 2023

(51) Int. Cl.
*B23D 61/06* (2006.01)

(52) U.S. Cl.
CPC ................... *B23D 61/06* (2013.01)

(58) Field of Classification Search
CPC ............... B23C 5/08; B23C 2200/128; B23C 2200/165; B23C 2210/369; B23C 2200/0416; B23B 29/043; B23B 2200/088; B23B 27/02; B23B 29/12; B23B 2200/165; B23B 2200/3636
See application file for complete search history.

(56) References Cited

U.S. PATENT DOCUMENTS

| | | | |
|---|---|---|---|
| 3,760,474 A | 9/1973 | Stein | |
| 4,580,930 A * | 4/1986 | Zinner | B23D 61/06 407/50 |
| 4,909,677 A * | 3/1990 | Noguchi | B23B 27/04 407/66 |
| 5,054,967 A | 10/1991 | Noguchi et al. | |

(Continued)

FOREIGN PATENT DOCUMENTS

| | | | |
|---|---|---|---|
| EP | 3231542 A1 * | 10/2017 | B23B 27/04 |
| JP | H09510149 A * | 10/1997 | B27B 27/10 |

(Continued)

OTHER PUBLICATIONS

International Search Report dated Sep. 22, 2023, issued in PCT counterpart application No. PCT/IL2023/050404.

(Continued)

*Primary Examiner* — Ghassem Alie
*Assistant Examiner* — Samuel A Davies
(74) *Attorney, Agent, or Firm* — Womble Bond Dickinson (US) LLP (57) ABSTRACT

A double-ended parting cutting insert. The cutting insert includes two cutting portions at opposite ends thereof which are oriented at 90° to each other. The cutting insert includes a pair of rake and support engagement grooves, the rake and support engagement grooves of each one of the pair converging in a direction away from a respective cutting portion. An insert holder includes a clamping portion having a resilient upper clamping jaw having an upper engagement ridge and a lower base jaw having a lower engagement ridge. A gap therebetween forms an insert receiving slot that has a slot opening. The upper and lower engagement ridges converge in a direction away from the slot opening. When the cutting insert is releasably attached to the insert holder, to constitute a fastened position of a cutting tool, the cutting insert is located in the insert receiving slot and resiliently clamped therein.

19 Claims, 7 Drawing Sheets

(56) References Cited

U.S. PATENT DOCUMENTS

| | | | |
|---|---|---|---|
| 5,076,739 A | 12/1991 | Pano | |
| 5,156,502 A * | 10/1992 | Satran | B23B 27/045 407/113 |
| 5,676,495 A | 10/1997 | Katbi et al. | |
| 5,829,924 A * | 11/1998 | Oshnock | B23B 27/045 407/117 |
| 5,836,723 A | 11/1998 | Von Haas et al. | |
| 5,934,843 A | 8/1999 | Brask et al. | |
| 5,975,812 A | 11/1999 | Friedman | |
| 6,074,138 A * | 6/2000 | Jonsson | B23B 27/045 407/120 |
| 6,176,649 B1 | 1/2001 | Friedman | |
| 6,261,032 B1 | 7/2001 | Duwe et al. | |
| 6,273,651 B1 | 8/2001 | Heinloth et al. | |
| 6,428,247 B1 | 8/2002 | Friedman | |
| 6,582,163 B2 | 6/2003 | Hansson et al. | |
| 6,648,560 B2 * | 11/2003 | Andras | B23B 27/045 407/117 |
| 7,094,006 B2 | 8/2006 | Hecht | |
| 7,419,337 B2 | 9/2008 | Berminge | |
| 7,510,355 B2 | 3/2009 | Havrda | |
| 7,665,933 B2 | 2/2010 | Nagaya et al. | |
| 7,866,924 B2 * | 1/2011 | Nagaya | B23B 29/043 407/102 |
| 7,883,300 B1 * | 2/2011 | Simpson, III | B23B 27/045 407/115 |
| 7,887,267 B2 * | 2/2011 | Niemi | B23B 29/043 407/117 |
| 8,104,999 B2 * | 1/2012 | Hecht | B23B 27/04 407/110 |
| 8,366,355 B2 | 2/2013 | Nagaya et al. | |
| 8,449,225 B2 | 5/2013 | Gati | |
| 8,647,028 B2 | 2/2014 | Athad | |
| 8,647,029 B2 | 2/2014 | Hecht | |
| 8,696,262 B2 | 4/2014 | Hecht | |
| 8,784,014 B2 | 7/2014 | Onodera | |
| 9,033,622 B2 | 5/2015 | Hecht | |
| 9,120,239 B2 | 9/2015 | Hecht | |
| 9,242,300 B2 | 1/2016 | Kaufmann et al. | |
| 10,857,603 B2 | 12/2020 | Athad | |
| 2004/0086415 A1 | 5/2004 | Gubanich et al. | |
| 2008/0240874 A1 | 10/2008 | Nagaya et al. | |
| 2009/0162154 A1 | 6/2009 | Jonsson et al. | |
| 2010/0119314 A1 | 5/2010 | Nagaya et al. | |
| 2011/0110733 A1 | 5/2011 | Hecht | |
| 2011/0158756 A1 | 6/2011 | Athad | |
| 2011/0255926 A1 | 10/2011 | Hecht | |
| 2012/0269588 A1 * | 10/2012 | Kaufmann | B23C 5/2213 407/100 |
| 2013/0058729 A1 | 3/2013 | Choi et al. | |
| 2013/0129428 A1 | 5/2013 | Henry et al. | |
| 2013/0170917 A1 | 7/2013 | Hecht | |
| 2013/0202372 A1 | 8/2013 | Hecht | |
| 2014/0030035 A1 * | 1/2014 | Hecht | B23B 27/045 407/115 |
| 2014/0050542 A1 | 2/2014 | Zeeb et al. | |
| 2014/0072379 A1 | 3/2014 | Hecht | |
| 2014/0133924 A1 | 5/2014 | Oren et al. | |
| 2014/0199128 A1 | 7/2014 | Hecht | |
| 2014/0321926 A1 | 10/2014 | Sadikov | |
| 2014/0348601 A1 | 11/2014 | Hecht | |
| 2015/0063929 A1 | 3/2015 | Hecht | |
| 2015/0117971 A1 | 4/2015 | Eisen | |
| 2015/0224581 A1 | 8/2015 | Tsuda | |
| 2017/0333997 A1 | 11/2017 | Kusuda | |
| 2018/0133806 A1 | 5/2018 | Son et al. | |
| 2018/0272431 A1 | 9/2018 | Athad | |
| 2019/0160555 A1 | 5/2019 | Hecht et al. | |
| 2019/0176238 A1 | 6/2019 | Andersson et al. | |
| 2020/0298319 A1 | 9/2020 | Hecht et al. | |

FOREIGN PATENT DOCUMENTS

| | | |
|---|---|---|
| WO | WO 2011/159119 | 12/2011 |
| WO | WO 2011/159119 A2 | 12/2011 |

OTHER PUBLICATIONS

Written Opinion dated Sep. 22, 2023, issued in PCT counterpart application No. PCT/IL2023/050404.

* cited by examiner

ROTATIONALLY ASYMMETRIC DOUBLE-ENDED GROOVING CUTTING INSERT, INSERT HOLDER AND CUTTING TOOL

FIELD OF THE INVENTION

The subject matter of the present application relates to cutting tools, and in particular to grooving and parting cutting tools, of the type in which a cutting insert is resiliently retained in an insert receiving slot of an insert holder. In particular the cutting insert is rotationally asymmetric, and double-ended, having two opposite cutting portions, and further in particular the cutting insert has a pair of two engagement grooves, and yet further in particular the two engagement grooves of each one of the pair converge towards each other in a direction away from a respective cutting portion.

BACKGROUND OF THE INVENTION

Grooving and parting cutting inserts typically have two opposing end surface and opposing top and bottom surfaces extending therebetween. The top and bottom surfaces are designed for clamping engagement with corresponding clamping surfaces on a base jaw and a clamping jaw of an insert receiving slot of an insert holder. The top and bottom surfaces can each include and upper and lower engagement groove or ridges, respectively, which mate with complementary grooves or ridges on the clamping surfaces, thereby reducing lateral displacement of the insert relative to the insert receiving slot.

The cutting insert can be single-ended, with a single cutting portion located at one end of the cutting insert. The cutting portion includes a cutting edge formed at the intersection of the top surface and one of the end surfaces. The engagement grooves or ridges can converge towards each other in a direction away from the cutting portion. In such a configuration the cutting insert can be secured in the insert receiving slot in a "self-grip" manner. That is to say, the base jaw and clamping jaw resiliently clamps the cutting insert without the need of an additional element, such as a screw, to urge the base jaw and a clamping jaw closed. Moreover, the self-grip configuration can allow for insertion of the cutting insert into insert receiving slot without the need of an insertion key either to open the base jaw and a clamping jaw or urge the cutting insert into the insert receiving slot. Examples of such cutting inserts are disclosed in, for example, U.S. Pat. Nos. 5,054,967 and 5,076,739.

Grooving and parting cutting inserts can also be double-ended (i.e., have two cutting portions at opposite ends of the cutting insert), with two cutting edges formed at the intersection of the top surface and both end surfaces. The "self-grip" configuration described above can be achieved by having two longitudinally offset upper engagement grooves on the cutting insert's top surface, each upper engagement groove along with the lower engagement groove converging towards each other in a direction away from a respective cutting portion. An example of such a cutting insert is disclosed in, for example, U.S. Pat. No. 10,857,603.

Another example of a double-ended parting and grooving insert is US20180133806, whose cutting edges at the opposite ends are oriented transverse to one another. In this insert, first mounting grooves associated with the insert's main rake faces extend in a generally angled direction from one end of the cutting insert towards the associated cutting portion. Meanwhile, second mounting grooves associated with the insert's seating surfaces extend in a generally angled direction between the insert's opposite ends.

It is an object of the subject matter of the present application to provide a new and improved double-ended "self-grip" cutting insert.

SUMMARY OF THE INVENTION

In accordance with a first aspect of the subject matter of the present application there is provided a double-ended cutting insert comprising:
  opposing first and second relief face surfaces and an insert peripheral surface extending therebetween about an insert longitudinal axis, the insert peripheral surface comprising opposing first rake and support face surfaces and opposing second rake and support face surfaces which all connect the first and second relief face surfaces;
  a first insert central axis oriented perpendicular to the insert longitudinal axis and extending through the first rake and support face surface;
  a second insert central axis oriented perpendicular to both the first insert central axis and the insert longitudinal axis, and extending through the second rake and support face surface;
  first and second cutting edges formed at the intersection of the first and second relief face surfaces and the first and second rake face surfaces, respectively;
  first rake and support engagement grooves which are recessed in the first rake and support face surfaces, respectively, and which open out to at least the second relief face surface;
  and second rake and support engagement grooves which are recessed in the second rake and support face surfaces, respectively, and which open out to at least the first relief face surface; wherein:
    the first rake and support engagement grooves extend along first rake and support groove longitudinal axes, respectively, which converge towards each other in a direction from the first relief face surface towards the second relief face surface defining an acute first groove wedge angle; and
    the second rake and support engagement grooves extend along second rake and support groove longitudinal axes, respectively, which converge towards each other in a direction from the second relief face surface towards the first relief face surface defining an acute second groove wedge angle.

In accordance with a second aspect of the subject matter of the present application, there is also provided an insert holder comprising a clamping portion comprising:
  opposing first and second clamping portion side surfaces and a clamping portion front end surface extending therebetween;
  a lower base jaw and an opposing upper clamping jaw which is resiliently displaceable relative to the lower base jaw; and
  an insert receiving slot being longitudinally elongated in a direction defining a slot longitudinal axis and opening out to the clamping portion front end surface forming a front slot opening, the insert receiving slot being formed from a gap between the lower base jaw and the upper clamping jaw and delimited by:
    a slot peripheral wall surface comprising:
      a clamping jaw surface, a base jaw lower surface and a slot rear surface extending therebetween, the clamping jaw surface being formed on the upper clamping jaw and the base jaw lower surface being formed on the lower base jaw;

upper and lower slot engagement ridges which project from the clamping jaw surface and base jaw lower surface respectively; wherein:

the upper and lower slot engagement ridges extend along upper and lower ridge longitudinal axes, respectively, which converge towards each other in a direction from the clamping portion front end surface towards the slot rear surface defining an acute ridge wedge angle;

the insert receiving slot has a slot vertical axis oriented perpendicular to the slot longitudinal axis and intersecting therewith, the slot vertical axis extending through the clamping jaw surface and the base jaw lower surface; characterized in that:

the slot rear surface comprises a slot rear stopper surface and a slot rear recessed surface which are oriented differently to each other, the slot rear stopper surface being closer to the first clamping portion side surfaces than the slot rear recessed surface and the slot rear recessed surface being closer to the second clamping portion side surfaces than the slot rear stopper surface; and the slot rear recessed surface overlaps with the slot rear stopper surface in a direction along the slot vertical axis and is further from the front slot opening in a direction along the slot longitudinal axis than the slot rear stopper surface.

In accordance with a third aspect of the subject matter of the present application, there is also provided a cutting tool comprising:

a cutting insert of the type described above; and an insert holder comprising a clamping portion comprising:

opposing first and second clamping portion side surfaces and a clamping portion front end surface extending therebetween;

a lower base jaw and an opposing upper clamping jaw which is resiliently displaceable relative to the lower base jaw; and an insert receiving slot being longitudinally elongated in a direction defining a slot longitudinal axis and opening out to the clamping portion front end surface forming a front slot opening, the insert receiving slot being formed from a gap between the lower base jaw and the upper clamping jaw and delimited by:

a slot peripheral wall surface comprising:

a clamping jaw surface, a base jaw lower surface and a slot rear surface extending therebetween, the clamping jaw surface being formed on the upper clamping jaw and the base jaw lower surface being formed on the lower base jaw;

upper and lower slot engagement ridges which project from the clamping jaw surface and base jaw lower surface respectively; wherein:

the upper and lower slot engagement ridges extend along upper and lower ridge longitudinal axes, respectively, which converge towards each other in a direction from the clamping portion front end surface towards the slot rear surface defining an acute ridge wedge angle; and the cutting tool is adjustable between a released and fastened position, and in the fastened position of the cutting tool:

the cutting insert is releasably attached to the insert holder; and the cutting insert is located in the insert receiving slot and resiliently clamped therein by the upper clamping jaw.

In accordance with a fourth aspect of the subject matter of the present application there is provided a double-ended cutting insert comprising:

opposing first and second relief face surfaces and an insert peripheral surface extending therebetween about an insert longitudinal axis, the insert peripheral surface comprising opposing first rake and support face surfaces and opposing second rake and support face surfaces which all connect the first and second relief face surfaces;

a first insert central axis oriented perpendicular to the insert longitudinal axis and extending through the first rake and support face surface;

a second insert central axis oriented perpendicular to both the first insert central axis and the insert longitudinal axis, and extending through the second rake and support face surface, first and second cutting edges formed at the intersection of the first and second relief face surfaces and the first and second rake face surfaces, respectively;

first rake and support engagement grooves which are recessed in the first rake and support face surfaces, respectively, and which open out to at least the second relief face surface; and second rake and support engagement grooves which are recessed in the second rake and support face surfaces, respectively, and which open out to at least the first relief face surface; wherein:

the cutting insert lacks 180° rotational symmetry about all three of the insert longitudinal axis, the first insert central axis and the second insert central axis;

for at least one-half its length, the first support engagement groove is mirror symmetric about a first insert bisector plane which contains the insert longitudinal axis and the first insert central axis; and for at least one-half its length, the second support engagement groove is mirror symmetric about a second insert bisector plane which contains the insert longitudinal axis and the second insert central axis.

It is understood that the above-said is a summary, and that features described hereinafter may be applicable in any combination to the subject matter of the present application, for example, any of the following features may be applicable to the cutting insert, the insert holder or the cutting tool:

The first and second support face surfaces can be identical to each other. The first and second rake face surfaces can be identical to each other. The first and second relief face surfaces can be identical to each other.

The first relief face surface can comprise a first insert stopper surface and a first relief surface which can be oriented differently to each other, the first relief surface extending from the first cutting edge towards the first insert stopper surface. The second relief face surface can comprise a second insert stopper surface and a second relief surface which can be oriented differently to each other, the second relief surface extending from the second cutting edge towards the second insert stopper surface.

The first and second rake engagement grooves can overlap in a direction along the insert longitudinal axis.

The first and second insert stopper surfaces can be planar and can be oriented perpendicular to the insert longitudinal axis.

The first and second relief surfaces can be sloped with respect to the insert longitudinal axis so that the cutting insert is a positive double-ended cutting insert.

One of the first rake and support groove longitudinal axes can be parallel to the insert longitudinal axis. One of the second rake and support groove longitudinal axes can be parallel to the insert longitudinal axis.

The first support groove longitudinal axis can be parallel to the insert longitudinal axis. The second support groove longitudinal axis can be parallel to the insert longitudinal axis.

The first rake engagement groove has a first rake groove depth which can increase in a direction away from the first relief face surface. The second rake engagement groove has a second rake groove depth which can increase in a direction away from the second relief face surface.

The first rake engagement groove has a first rake groove width which can increase in a direction away from the first relief face surface. The second rake engagement groove has a second rake groove width which can increase in a direction away from the second relief face surface.

Along the insert longitudinal axis, the first and second rake engagement grooves can be spaced apart from the first and second relief face surfaces, respectively. The first and second support engagement grooves can open out to the first and second relief face surfaces, respectively.

The first and second rake engagement grooves can each comprise two opposing rake groove flank surfaces which can slope inwardly in opposite widthwise directions of the respective rake engagement groove, so that they converge towards each other. The first and second support engagement grooves can each comprise two opposing support groove flank surfaces which can slope inwardly in opposite widthwise directions of the respective support engagement groove, so that they converge towards to each other.

Each rake groove flank surface can comprise a respective rake groove abutment surface, each rake groove abutment surface being optionally planar. In a cross-sectional view taken in a plane perpendicular to the insert longitudinal axis, the rake groove abutment surfaces can define an external rake groove flank angle. Each support groove flank surface can comprise a respective support groove abutment surface, each support groove abutment surface being optionally planar. In a cross-sectional view taken in a plane perpendicular to the insert longitudinal axis, the support groove abutment surfaces can define an external support groove flank angle.

The two rake groove flank surfaces can transition into each other via a rake groove transition portion, the rake groove transition portion being optionally defined by a line or an edge. The two opposing support groove flank surfaces can transition into each other via a support groove transition portion, the support groove transition portion being optionally defined by a line or an edge. The rake and support groove transition portions of the first rake and support engagement grooves, respectively, can be contained in a first insert bisector plane containing the insert longitudinal axis and the first insert central axis. The rake and support groove transition portions of the second rake and support engagement grooves, respectively, can be contained in a second insert bisector plane containing the insert longitudinal axis and the second insert central axis.

The cutting insert can be devoid of a through-hole.

The upper and lower slot engagement ridges can extend to the clamping portion front end surface.

The slot rear stopper surface can be planar and oriented perpendicular to the slot longitudinal axis.

The lower ridge longitudinal axis can be parallel to the slot longitudinal axis.

The upper and lower slot engagement ridges can each comprise two opposing ridge flank surfaces which slope outwardly in opposite widthwise directions of the respective upper and lower slot engagement ridges, so that they converge towards each other. The two ridge flank surfaces can transition into each other via a ridge transition portion, the ridge transition portion being defined optionally by a planar surface. An intersection of the ridge transition portion and the two ridge flank surfaces can form two ridge flank abutment edges.

In the fastened position of the cutting tool, the rake groove abutment surfaces of the first rake engagement groove can abut the upper slot engagement ridge. The support groove abutment surfaces of the first support engagement groove can abut the lower slot engagement ridge.

In the fastened position of the cutting tool, the cutting insert's rake groove abutment surfaces of the first rake engagement groove can abut the two ridge flank abutment edges of the upper slot engagement ridge. The support groove abutment surfaces of the first support engagement groove can abut the two ridge flank abutment edges of the lower slot engagement ridge.

Each rake groove abutment surface can be planar. Each support groove abutment surface can be planar.

The rake groove abutment surfaces of the first rake engagement groove can be located closer to the first cutting edge than to the second cutting edge.

In the fastened position of the cutting tool, the rake groove abutment surfaces and the support groove abutment surfaces of the second support engagement groove may not abut any surfaces of the insert receiving slot.

In the fastened position of the cutting tool, the slot rear stopper surface can abut the first insert stopper surface. The slot rear recessed surface can be spaced apart from the first insert stopper surface.

BRIEF DESCRIPTION OF THE FIGURES

For a better understanding of the present application and to show how the same may be carried out in practice, reference will now be made to the accompanying drawings, in which.

It will be appreciated that for simplicity and clarity of illustration, elements shown in the figures have not necessarily been drawn to scale. For example, the dimensions of some of the elements may be exaggerated relative to other elements for clarity, or several physical components may be included in one functional block or element. Where considered appropriate, reference numerals may be repeated among the figures to indicate corresponding or analogous elements.

DETAILED DESCRIPTION OF THE INVENTION

In the following description, various aspects of the subject matter of the present application will be described. For purposes of explanation, specific configurations and details are set forth in sufficient detail to provide a thorough understanding of the subject matter of the present application. However, it will also be apparent to one skilled in the art that the subject matter of the present application can be practiced without the specific configurations and details presented herein.

Figure 1:
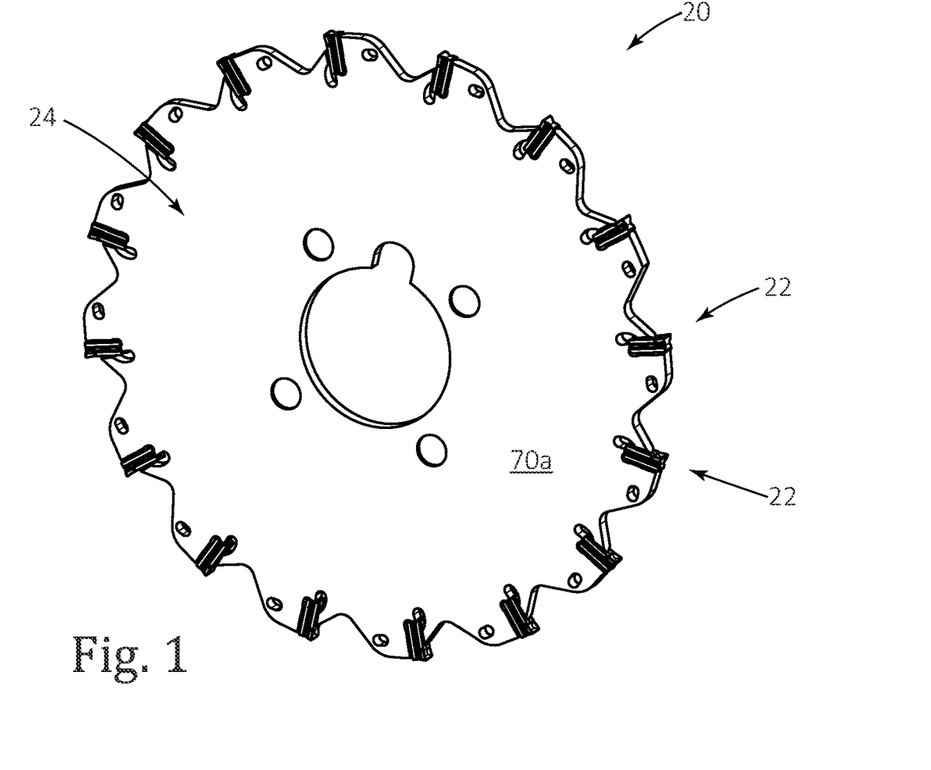
FIG. 1 is a perspective view of a cutting tool.

Attention is first drawn to FIG. 1 showing a cutting tool 20, for chip removal, in accordance with embodiments of the subject matter of the present application. The cutting tool has one (or more) cutting insert(s) 22 which can be typically made from cemented carbide. The cutting tool 20 also has an insert holder 24 which can be typically made from steel. The insert holder 24 has one (or more) insert receiving slot(s) 26 in which the cutting inserts 22 are resiliently retained. In this non-limiting example, the cutting tool 20 is a rotary slot milling tool having a disk-shaped insert holder 24 and a plurality of cutting inserts 22 releasably attached to the periphery thereof. It is noted, however, that the subject matter of the present application also applies to other types of cutting tools, for example, but not limited to, fixed (i.e., non-rotary) turning tools suitable for longitudinal turning (e.g., grooving and parting) having a single cutting insert 22 releasably attached to a forward end of the insert holder 24. The cutting tool 20 is adjustable between a released and fastened position. In the fastened position of the cutting tool 20, the cutting insert 22 is releasably attached to the insert holder 24.

Reference is now made to FIGS. 4 to 8, showing the cutting insert 22, in accordance with the subject matter of the present application. The cutting insert 22 includes a unitary integral one-piece construction. The cutting insert 22 has an insert longitudinal axis A along which the cutting insert 22 is elongated. The cutting insert 22 includes opposing first and second relief face surfaces 28a, 28b. The first and second relief face surfaces 28a, 28b are intersected by the insert longitudinal axis A. The first and second relief face surfaces 28a, 28b can be identical to each other.

The cutting insert 22 includes an insert peripheral surface 30 which extends between the first and second relief face surfaces 28a, 28b. The insert peripheral surface 30 extends about the insert longitudinal axis A.

Figure 4:
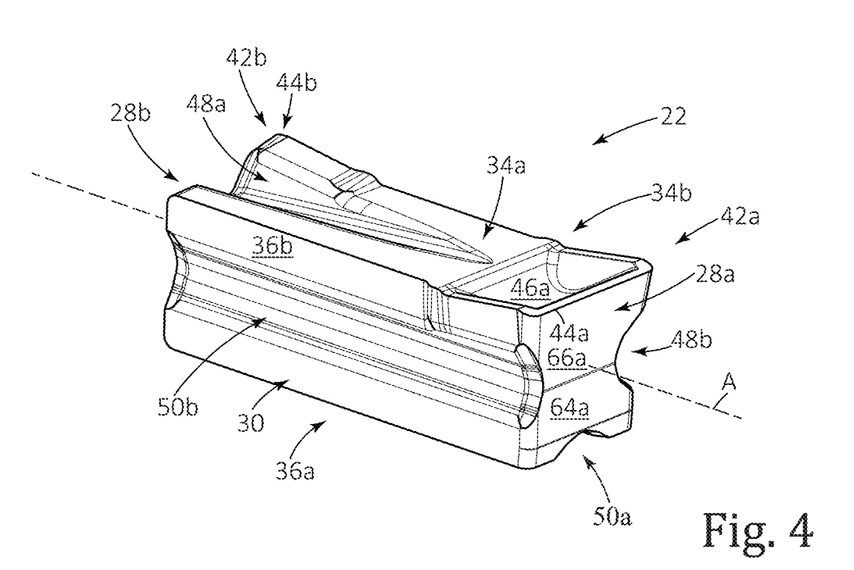
FIG. 4 is a perspective view of the cutting insert shown in FIG. 2.
Figure 6:
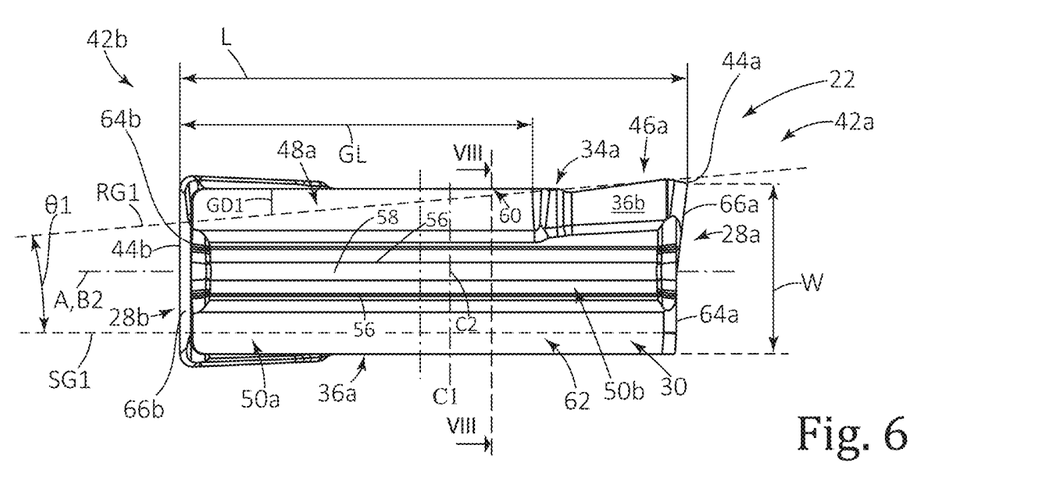
FIG. 6 is a first side view of the cutting insert shown in FIG. 3.
Figure 7:
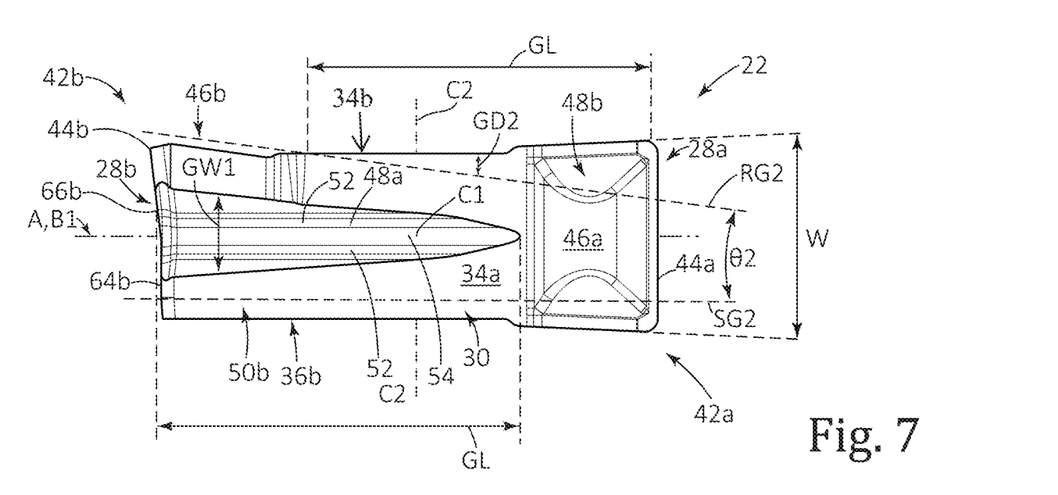
FIG. 7 is a second side view of the cutting insert shown in FIG. 3.
Figure 8:
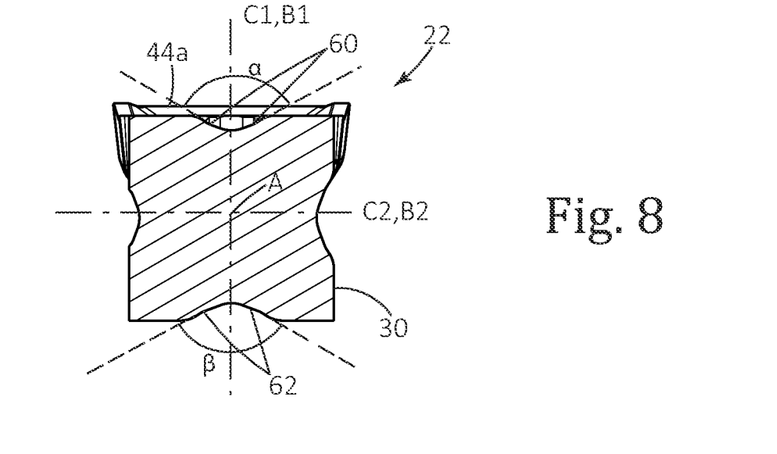
FIG. 8 is a cross section view taken along line VIII-VIII shown in FIG. 7.

Referring in particular to FIGS. 4, 6 and 7, the insert peripheral surface 30 includes opposing first rake and support face surfaces 34a, 36a. The cutting insert 22 has a first insert central axis C1 oriented perpendicular to, and intersecting, the insert longitudinal axis A and which extends through (i.e., intersects) the first rake and support face surface 34a, 36a. The first rake and support face surfaces 34a, 36a connect the first and second relief face surfaces 28a, 28b.

The insert peripheral surface 30 further includes opposing second rake and support face surfaces 34b, 36b. The cutting insert 22 has a second insert central axis C2 oriented perpendicular to and intersecting both the first insert central axis C2 and the insert longitudinal axis A. The second insert central axis C2 extends through (i.e., intersects) the second rake and support face surface 34b, 36b. The second rake and support face surfaces 34b, 36b connect the first and second relief face surfaces 28a, 28b.

Notably, the cutting insert 22 lacks 180° rotational symmetry about all three of the insert longitudinal axis A, the first insert central axis C1 and the second insert central axis C2. More particularly, the cutting insert 22 lacks rotational symmetry about each of these axes, at any angle that is not a multiple of 360°. As such, the cutting insert may be considered to be rotationally asymmetric.

In accordance with some embodiments of the subject matter of the present application, the second rake and support face surfaces 34b, 36b can extend between the first rake and support face surfaces 34a, 36a. The first and second rake face surfaces 34a, 34b can be identical to each other. The first and second support face surfaces 36a, 36b can be identical to each other. The insert longitudinal axis A, and the first and second central axes C1, C2 can all be mutually perpendicular to each other.

As seen in FIG. 6, the cutting insert 22 has a cutting insert length L measured in a direction along the insert longitudinal axis A (i.e., between the first and second relief face surfaces 28a, 28b). The cutting insert 22 has four cutting insert widths W defined by the widest dimension of the first rake and support face surfaces 34a, 36a and the second rake and support face surfaces 34b, 36b, respectively as measured perpendicular to the insert longitudinal axis A in FIGS. 6 and 7. The four cutting insert widths W can be substantially the same. Thus, the cutting insert 22 can have a cuboid basic shape.

The cutting insert 22 includes first and second cutting portions 42a, 42b. The first and second cutting portions 42a, 42b are locate at opposite axial lends of the cutting insert 22. The first and second cutting portions 42a, 42b include first and second cutting edges 44a, 44b, respectively. The first and second cutting edges 44a, 44b are formed at the intersection of the first and second relief face surfaces 28a, 28b and the first and second rake face surfaces 34a, 34b, respectively. The first and second cutting edges 44a, 44b are designed for metal cutting operations, in particular grooving metal cutting operations. It is noted that the first and second cutting portions 42a, 42b (and also the first and second cutting edges 44a, 44b) are oriented at 90° to each other about the insert longitudinal axis A. Thus, the cutting insert 22 is rotationally asymmetrical about the insert longitudinal axis A, the first insert central axis C1 and the first insert central axis C2. The first and second rake face surfaces 34a, 34b includes a first and second rake surface 46a, 46b, adjacent the first and second cutting edges 44a, 44b, respectively. The purpose and geometry of the first and second rake surfaces 46a, 46b are known in the art and are not part of the present invention.

Reference is made to FIGS. 6 and 7, where the "unseen" engagement groove are indicated with dashed lines. The cutting insert 22 includes a pair of rake and support engagement grooves 48a, 50a, 48b, 50b. The rake and support engagement grooves 48a, 50a, 48b, 50b are designed for providing a secure mounting in the insert receiving slot 26 as described later in the description. One of the pair is associated to each respective one of the cutting portions 42a, 42b. Specifically, the cutting insert 22 includes first rake and support engagement grooves 48a, 50a which are recessed in the first rake and support face surfaces 34a, 36a, respectively. The first rake and support engagement grooves 48a, 50a are associated with the first cutting edge 44a. Likewise, the cutting insert 22 includes second rake and support engagement grooves 48b, 50b which are recessed in the second rake and support face surfaces 34b, 36b respectively. The second rake and support engagement grooves 48b, 50b are associated with the second cutting edge 44b. The first rake and support engagement grooves 48a, 50a open out to at least the second relief face surface 28b. The second rake and support engagement grooves 48b, 50b open out to at least the first relief face surface 28a. In accordance with some embodiments of the subject matter of the present application, along the insert longitudinal axis (A), the first and second rake engagement grooves 48a, 48b can be spaced apart from the first and second relief face surfaces 28a, 28b, respectively. In particular, the first and second rake engagement grooves 48a, 48b can be spaced apart from the first and second rake surfaces 46a, 46b, respectively. The first and second support engagement grooves 50a, 50b can open out to the first and second relief face surfaces 28a, 28b, respectively.

Referring to FIG. 7, the first and second rake engagement grooves 48a, 48b can overlap in a direction along the insert longitudinal axis A. Thus, the cutting insert 22 can have a reduced cutting insert length L compared to the cutting insert shown in, U.S. Pat. No. 10,857,603, where the two projecting insertion ridge are offset in the longitudinal direction. The rake engagement grooves 48a, 48b can have a rake groove length GL (as measured along the insert longitudinal axis A. The rake groove length GL can be greater than half the cutting insert length L.

Figure 5:
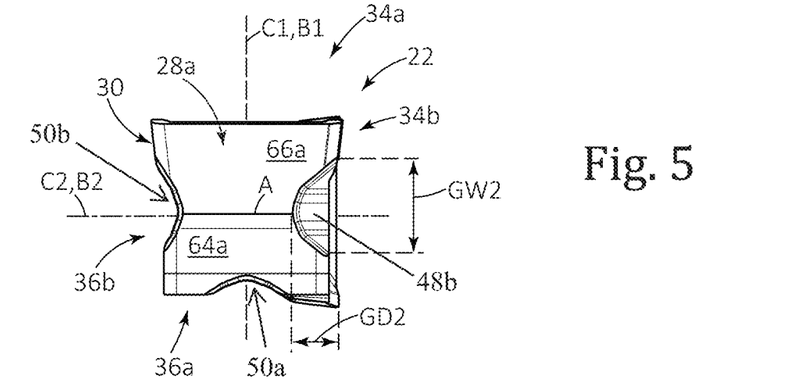
FIG. 5 is an end view of the cutting insert shown in FIG. 3.

Referring to FIGS. 5-7, the first rake engagement groove 48a has a first rake groove depth GD1. In accordance with some embodiments of the subject matter of the present application, the first rake groove depth GD1 can increase in a direction away from the first relief face surface 28a.

The first rake engagement groove 48a has a first rake groove width GW1. The first rake groove width GW1 can increase in a direction away from the first relief face surface 28a.

The second rake engagement groove 48b has a second rake groove depth GD2. In accordance with some embodiments of the subject matter of the present application, the second rake groove depth GD2 can increase in a direction away from the second relief face surface 28b The second rake engagement groove 48b has a second rake groove width GW2. The second rake groove width GW2 can increase in a direction away from the second relief face surface 28b.

As best seen in FIG. 7, the first rake engagement groove 48a, which is recessed in the first rake face surface 34a, is spaced apart from both the second rake face surface 34b and the second support face surface 36b. As seen FIG. 5, the second rake engagement groove 48b, which is recessed in the second rake face surface 34b, is apart from both the first rake face surface 34a and the first support face surface 36a. As also seen in FIG. 5, the first support engagement groove 50a (which is recessed in the first support face surface 36a) is spaced apart from both the second rake face surface 34b and the second support face surface 36b, while the second support engagement groove 50b (which is recessed in the second support face surface 36b) is spaced apart from both the first rake face surface 34a and the first support face surface 36a.

Referring to FIG. 7, in accordance with some embodiments of the subject matter of the present application, the first and second rake engagement grooves 48a, 48b can each include two opposing rake groove flank surfaces 52. The two rake groove flank surfaces 52 slope inwardly in opposite widthwise directions of the respective rake engagement groove 48a, 48b, so that they converge towards each other. The two rake groove flank surfaces 52 can transition into each other via a rake groove transition portion 54. The rake groove transition portion 54 can be defined by a line or an edge (and thus the two rake groove flank surfaces 52 intersect each other). In this non-limiting example shown in the drawings, the rake groove transition portion 54 is defined by a line.

Referring to FIG. 6, similarly, the first and second support engagement grooves 50a, 50b can each include two opposing support groove flank surfaces 56. The two support groove flank surfaces 56 slope inwardly in opposite widthwise directions of the respective support engagement groove 50a, 50b, so that they converge towards each other. The two support groove flank surfaces 56 can transition into each other via a support groove transition portion 58. The support groove transition portion 58 can be defined by a line or an edge (and thus the two support groove flank surfaces 56 intersect each other). In this non-limiting example shown in the drawings, the support groove transition portion 58 is defined by line.

In accordance with some embodiments of the subject matter of the present application, the rake and support groove transition portions 54, 58 of the first rake and support engagement grooves 48a, 50a, respectively, can be intersected by a first insert bisector plane B1 which contains the insert longitudinal axis A and the first insert central axis C1. In the configuration having the rake and support groove transition portions 54, 58 defined by lines or edges, the rake and support groove transition portions 54, 58 of the first rake and support engagement grooves 48a, 50a, respectively, can be contained in the first insert bisector plane B1.

The rake and support groove transition portions 54, 58 of the second rake and support engagement grooves 48b, 50b, respectively, can be intersected by a second insert bisector plane B2 which contains the insert longitudinal axis A and the second insert central axis C2. In the configuration having rake and support groove transition portions 54, 58 defined by lines or edges, the rake and support groove transition portions 54, 58 of the second rake and support engagement grooves 48b, 50b, respectively, can be contained in the second insert bisector plane B2. The first and second bisector planes B1, B2 can be perpendicular to each other and intersect each other along the insert longitudinal axis A.

In accordance with some embodiments of the subject matter of the present application, each rake groove flank surface 52 can include a respective rake groove abutment surface 60, for abutting corresponding surfaces in the insert receiving slot 26. Each rake groove abutment surface 60 can be planar. In a cross-sectional view taken in a plane perpendicular to the insert longitudinal axis A and intersecting the rake groove abutment surfaces 60 (i.e., FIG. 8), the rake groove abutment surfaces 60 can define an external rake groove flank angle α. The rake groove flank angle α can be obtuse. The rake groove abutment surfaces 60 of the first rake engagement groove 48a can exhibit mirror symmetry about the first insert bisector plane B1. The rake groove abutment surfaces 60 of the second rake engagement groove 48b can exhibit mirror symmetry about the second insert bisector plane B2. Similarly, each support groove flank surface 56 can include a respective support groove abutment surface 62, for abutting corresponding surfaces in the insert receiving slot 26. Each support groove abutment surface 62 can be planar. In a cross-sectional view taken in a plane perpendicular to the insert longitudinal axis A and intersecting the support groove abutment surfaces 62 (i.e., FIG. 8), the support groove abutment surfaces 62 can define an external support groove flank angle $\beta$. The support groove flank angle $\beta$ can be obtuse. The support groove abutment surfaces 60 of the first support engagement groove 50a can exhibit mirror symmetry about the first insert bisector plane B1. The support groove abutment surfaces 62 of the second support engagement groove 50b can exhibit mirror symmetry about the second insert bisector plane B2. It should be appreciated that use of the terms "internal angle" and "external angle" throughout the description and claims refers to an angle between two planar surface components of a pair of surfaces as measured internal and external to the member on which the two surface components are formed, respectively.

As can be seen from FIGS. 5 and 6, for at least one-half their lengths, the first and second support engagement grooves 50a, 50b may be mirror symmetric about their respective first and second bisector planes B1, B2. This helps promote even and stable seating of the cutting insert 22 on the base jaw 80. In some embodiments, for their entire lengths, the first and second support engagement grooves 50a, 50b may straddle their respective first and second bisector planes B1, B2. In some embodiments, for their entire lengths, the first and second support engagement grooves 50a, 50b may be mirror symmetric about their respective first and second bisector planes B1, B2.

Referring to FIGS. 6 and 7, the first rake and support engagement grooves 48a, 50a extend along first rake and support groove longitudinal axes RG1, SG1, respectively. More specifically, in accordance with some embodiments of the subject matter of the present application, each of the first rake and support groove longitudinal axes RG1, SG1, may lay on a corresponding one of the rake and support groove transition portions 54, 58 belonging to the respective first rake and support engagement grooves 48a, 50a. Likewise, the second rake and support engagement grooves 48b, 50b extend along second rake and support groove longitudinal axes RG2, SG2, respectively. More specifically, in accordance with some embodiments of the subject matter of the present application, each of the second rake and support groove longitudinal axes RG2, SG2 may lay on a corresponding one of the rake and support groove transition portions 54, 58 belonging to the respective second rake and support engagement grooves 48b, 50b.

In accordance with some embodiments of the subject matter of the present application, one of the first rake and support groove longitudinal axes RG1, SG1 can be parallel to the insert longitudinal axis A. Preferably, the first support groove longitudinal axis SG1 can be parallel to the insert longitudinal axis A. Likewise, one of the second rake and support groove longitudinal axes RG2, SG2 can be parallel to the insert longitudinal axis A. Preferably, the second support groove longitudinal axis SG2 can be parallel to the insert longitudinal axis A.

The first rake and support groove longitudinal axes RG1, SG1 converge towards each other in a direction from the first relief face surface 28a towards the second relief face surface 28b (i.e., away from the first cutting portion 42a) defining an acute first groove wedge angle $\theta 1$. Likewise, the second rake and support groove longitudinal axes RG2, SG2 converge towards each other in a direction from the second relief face surface 28b towards the first relief face surface 28a (i.e., away from the second cutting portion 42b) defining an acute second groove wedge angle $\theta 2$.

Reverting to FIG. 5, in accordance with some embodiments of the subject matter of the present application, the first relief face surface 28a can include a first insert stopper surface 64a. The second relief face surface 28b can include a second insert stopper surface 64b. The first and second insert stopper surfaces 64a, 64b are designed to position the cutting insert 22 in a predetermined longitudinal position in the insert receiving slot 26 and also provide resistance in the longitudinal direction against cutting forces. As seen in FIGS. 6 and 7, the first and second insert stopper surfaces 64a, 64b can be planar and oriented perpendicular to the insert longitudinal axis A.

In accordance with some embodiments of the subject matter of the present application, as also seen in FIGS. 6 and 7, the first relief face surface 28a can include a first relief surface 66a which extends from the first cutting edge 44a towards the first insert stopper surface 64a. That is to say, the first relief surface 66a is located between the first cutting edge 44a and the first insert stopper surface 64a. The first relief surface 66a can be oriented differently to the first insert stopper surface 64a, and thus the two surfaces 64a, 66a are non-coplanar and angled relative to one another. The first relief surface 66a can be sloped with respect to the insert longitudinal axis A so that the cutting insert 22 is a positive cutting insert at the first cutting portion 42a. That is to say, in a first side view of the cutting insert 22 (along the second insert central axis C2—see FIG. 6), the first relief surface 66a can slope from the first cutting edge 44a downwardly and inwardly. The first relief surface 66a can extend to (i.e., intersect) the first insert stopper surface 64a. Referring to FIG. 7, the first relief surface 66a can be further from the second relief face surface 28b in a direction along the insert longitudinal axis A than the first insert stopper surface 64a.

Likewise, in accordance with some embodiments of the subject matter of the present application, the second relief face surface 28b can include a second relief surface 66b which extends from the second cutting edge 44b towards the second insert stopper surface 64b. That is to say, the second relief surface 66b is located between the second cutting edge 44b and the second insert stopper surface 64b. The second relief surface 66b can be oriented differently to the second insert stopper surface 64b, and thus the two surfaces 64b, 66b are non-coplanar and angled relative to one another. The second relief surface 66b can be sloped with respect to the insert longitudinal axis A so that the cutting insert 22 is a positive cutting insert at the second cutting portion 42b. That is to say, in a second side view of the cutting insert 22 (along the first insert central axis C1—see FIG. 7), the second relief surface 66b can slope from the second cutting edge 44b downwardly and inwardly. The second relief surface 66b can extend to (i.e., intersect) the second insert stopper surface 64b. The second relief surface 66b can be further from the first relief face surface 28a in a direction along the insert longitudinal axis A than the second insert stopper surface 64b.

Figure 2:
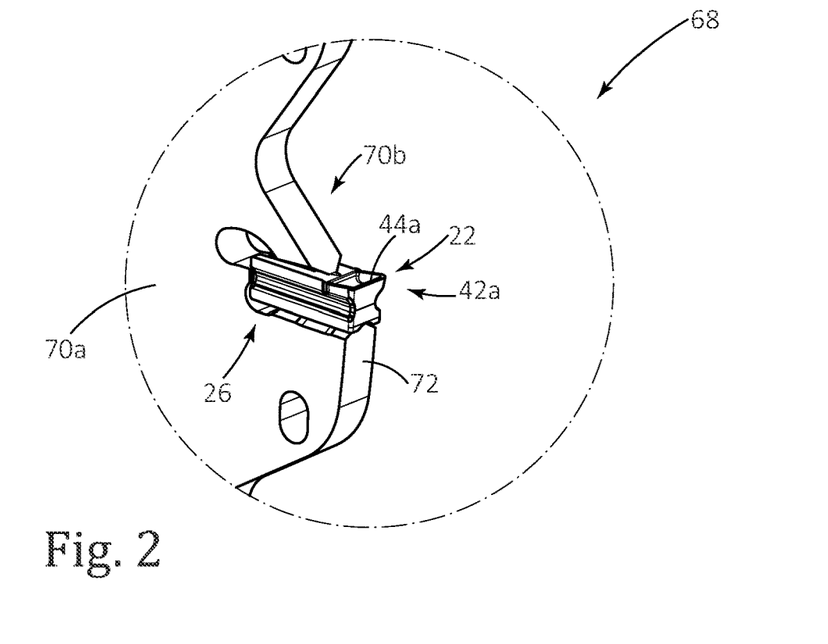
FIG. 2 is a fragmentary perspective view of the cutting tool shown in FIG. 1, showing a clamping portion having an insert receiving slot, and a cutting insert resiliently retained therein.
Figure 3:
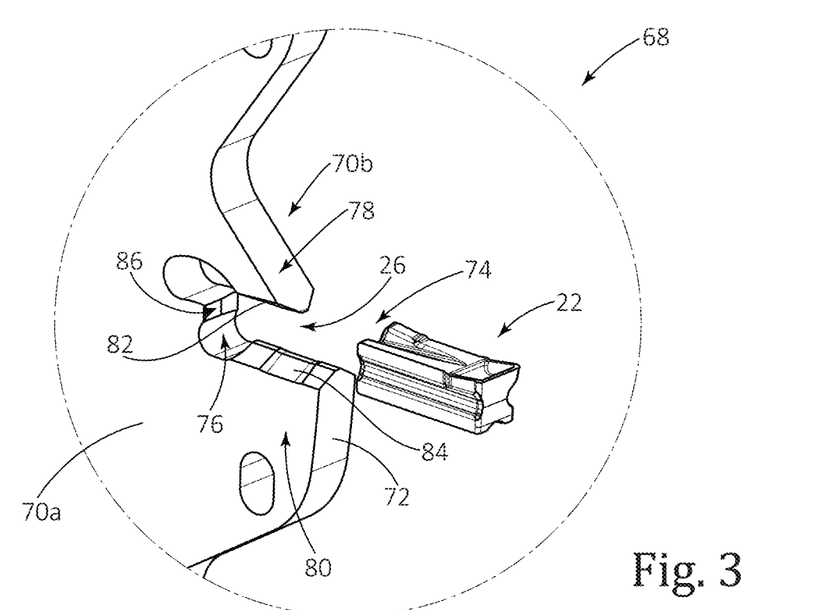
FIG. 3 is an exploded fragmentary perspective view of the cutting tool shown in FIG. 2.

Attention is drawn back to FIG. 1 showing an insert holder 24 in accordance with the present application. Referring to FIGS. 2 and 3, the insert holder 24 includes a clamping portion 68. The clamping portion 68 includes opposing first and second clamping portion side surfaces 70*a*, 70*b* and a clamping portion front end surface 72 which extends therebetween.

The clamping portion 68 includes an upper clamping jaw 78 and a lower base jaw 80 opposite thereto. The upper clamping jaw 78 is resiliently displaceable relative to the lower base jaw 80.

Figure 9:
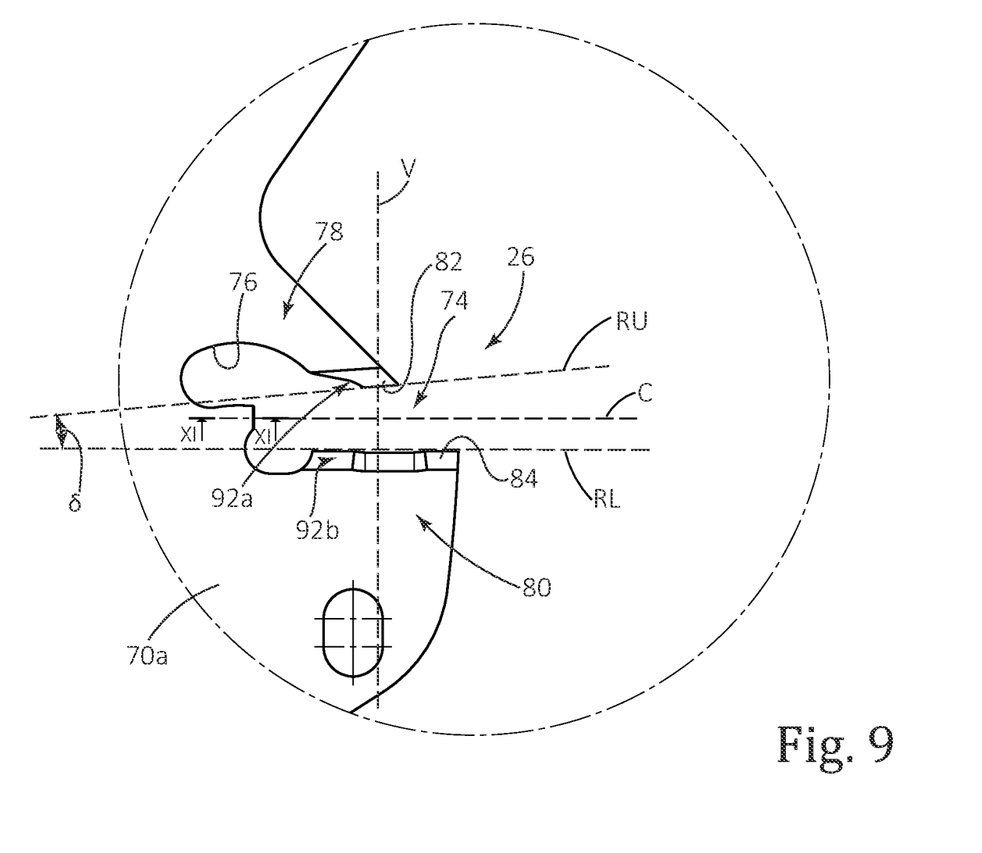
FIG. 9 is a side view of the clamping portion shown in FIG. 1.

Referring to FIG. 9, the clamping portion 68 includes an insert receiving slot 26. The insert receiving slot 26 is designed to receive and resiliently engage the cutting insert 22. The insert receiving slot 26 is longitudinally elongated in a direction defining a slot longitudinal axis C. The insert receiving slot 26 opens out to the clamping portion front end surface 72 forming a front slot opening 74. The insert receiving slot 26 also opens out to the first and second clamping portion side surfaces 70*a*, 70*b*.

The insert receiving slot 26 is formed from a gap between the upper clamping jaw 78 and the lower base jaw 80. The insert receiving slot 26 is delimited by a slot peripheral wall surface 76. The slot peripheral wall surface 76 extends between the first and second clamping portion side surfaces 70*a*, 70*b*. The slot peripheral wall surface 76 includes a clamping jaw surface 82 located on the upper clamping jaw 78. The slot peripheral wall surface 76 includes a base jaw lower surface 84 located on the lower base jaw 80. The base jaw lower surface 84 faces the clamping jaw surface 82.

The insert receiving slot 26 has a slot vertical axis V oriented perpendicular to the slot longitudinal axis C and intersecting therewith. The slot vertical axis V extends through (i.e., intersects) the clamping jaw surface 82 and the base jaw lower surface 84. In accordance with some embodiments of the subject matter of the present application, the insert receiving slot 26 can exhibit mirror symmetry about a slot bisector plane B, which contains the slot longitudinal axis C and the slot vertical axis V.

Figure 10:
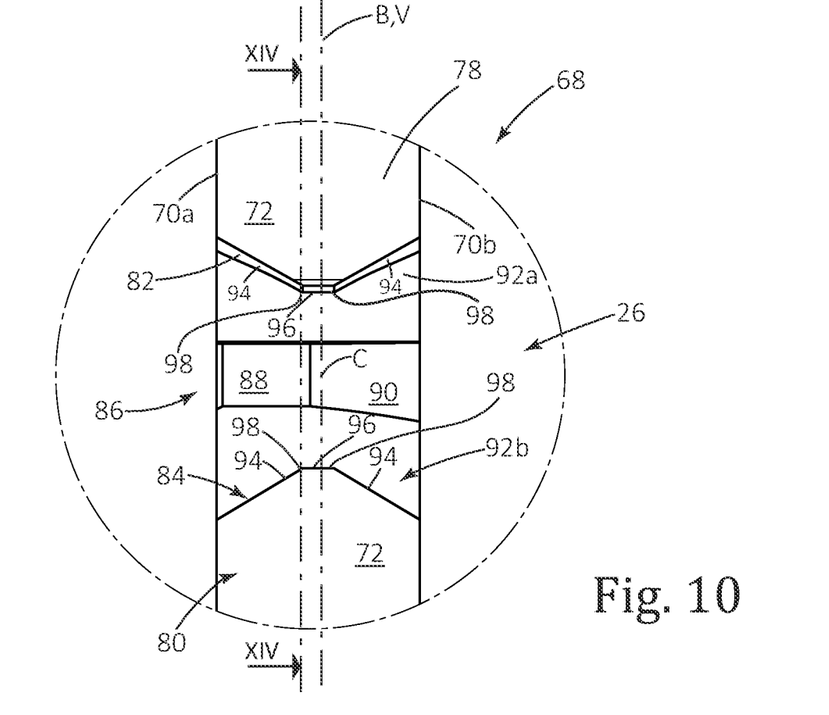
FIG. 10 is a front view of the clamping portion shown in FIG. 9.
Figure 11:
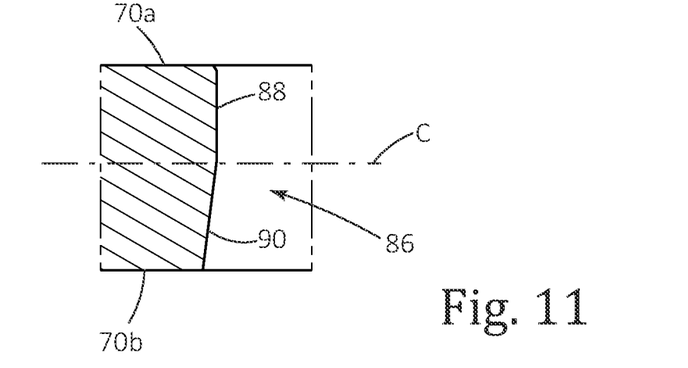
FIG. 11 is a cross section view taken along line XI-XI shown in FIG. 9.

Referring to FIGS. 10 and 11, the slot peripheral wall surface 76 includes a slot rear surface 86 which extends between the clamping jaw surface 82 and the base jaw lower surface 84. Generally speaking, the slot rear surface 86 faces the front slot opening 74. In accordance with some embodiments of the subject matter of the present application, the slot rear surface 86 can include a slot rear stopper surface 88 and a slot rear recessed surface 90 which are oriented differently to each other, and thus the two surfaces 88, 90 are non-coplanar and angled relative to one another.

The slot rear stopper surface 88 can be closer to the first clamping portion side surfaces 70*a* than the slot rear recessed surface 90. The slot rear stopper surface 88 can intersect the first clamping portion side surfaces 70*a*. The slot rear stopper surface 88 can be planar and oriented perpendicular to the slot longitudinal axis C.

The slot rear recessed surface 90 can be closer to the second clamping portion side surfaces 70*b* than the slot rear stopper surface 88. The slot rear recessed surface 90 can intersect the second clamping portion side surfaces 70*b*.

The slot rear stopper surface 88 and a slot rear recessed surface 90 can intersect with each other. The slot rear recessed surface 90 can overlap with the slot rear stopper surface 88 in a direction along the slot vertical axis V. The slot rear recessed surface 90 can be further from the front slot opening 74 in a direction along the slot longitudinal axis C than the slot rear stopper surface 88. This allows the slot rear stopper surface 88 to abut the second insert stopper surface 64*b* (in the fastened position of the cutting tool 20) even with positive geometry at the second cutting portion 42*b*. The slot rear recessed surface 90 can be planar. Referring to FIG. 11, the slot rear recessed surface 90 can slope inwardly (i.e., away from the front slot opening 74) in a direction from the first clamping portion side surfaces 70*a* towards the second clamping portion side surfaces 70*b*.

The clamping portion 82 includes upper and lower slot engagement ridges 92*a*, 92*b* which project from the clamping jaw surface 82 and base jaw lower surface 84 respectively. The upper and lower slot engagement ridges 92*a*, 92*b* are designed to engage with a respective one of the pair of rake and support engagement grooves 48*a*, 50*a*, 48*b*, 50*b*. In accordance with some embodiments of the subject matter of the present application, the upper and lower slot engagement ridges 92*a*, 92*b* can extend to the clamping portion front end surface 72.

In accordance with some embodiments of the subject matter of the present application, the upper and lower slot engagement ridges 92*a*, 92*b* can each include two opposing ridge flank surfaces 94. The two ridge flank surfaces 94 slope outwardly in opposite widthwise directions of the respective upper and lower slot engagement ridge 92*a*, 92*b*, so that they converge towards each other. The two ridge flank surfaces 94 can transition into each other via a ridge transition portion 96. In this non-limiting example shown in the drawings, the ridge transition portion 96 is defined by a planar surface (and thus the two ridge flank surfaces 94 are spaced apart from each other). The intersection of the ridge transition portion 96 and the two ridge flank surfaces 94 can form two ridge flank abutment edges 98.

The upper and lower slot engagement ridges 92*a*, 92*b* extend along upper and lower ridge longitudinal axes RU, RL, respectively. More specifically, in accordance with some embodiments of the subject matter of the present application, each of the upper and lower ridge longitudinal axes RU, RL, may lay on a corresponding ridge transition portion 96 belonging to the respective upper and lower slot engagement ridge 92*a*, 92*b*.

In accordance with some embodiments of the subject matter of the present application, the lower ridge longitudinal axis RL can be parallel to the slot longitudinal axis C.

The upper and lower ridge longitudinal axes RU, RL converge towards each other in a direction from the clamping portion front end surface 72 towards the slot rear surface 86 (i.e., away from the front slot opening 74) defining an acute ridge wedge angle S.

Figure 12:
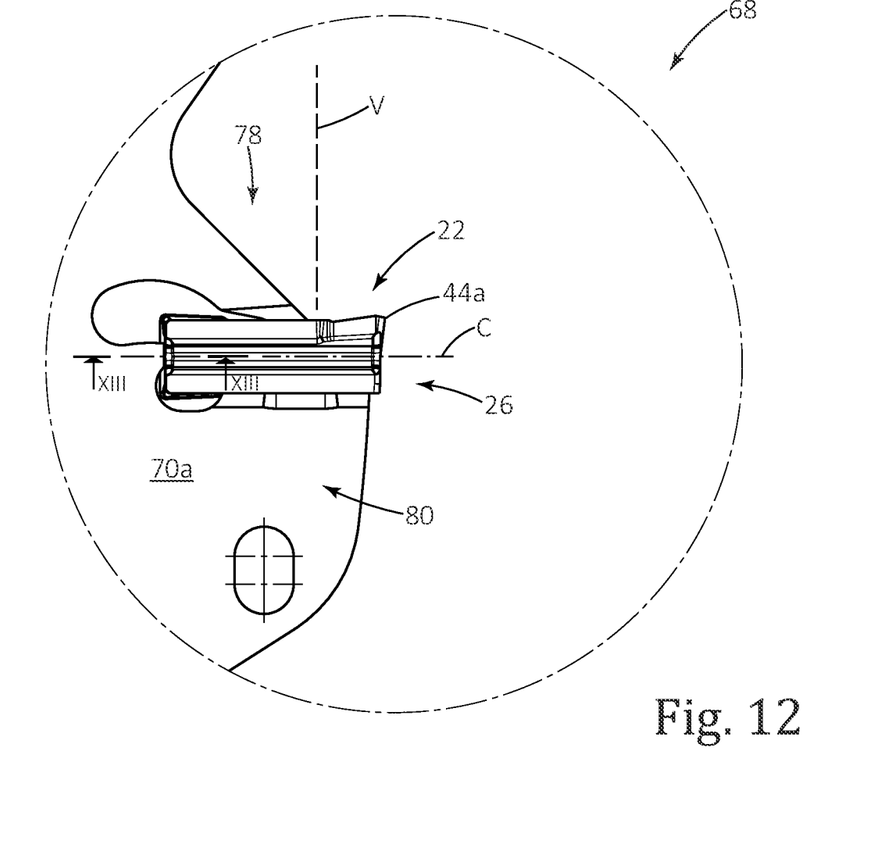
FIG. 12 is a side view of the clamping portion and the cutting insert shown in FIG. 2, when the cutting tool is in a fastened position.
Figure 13:
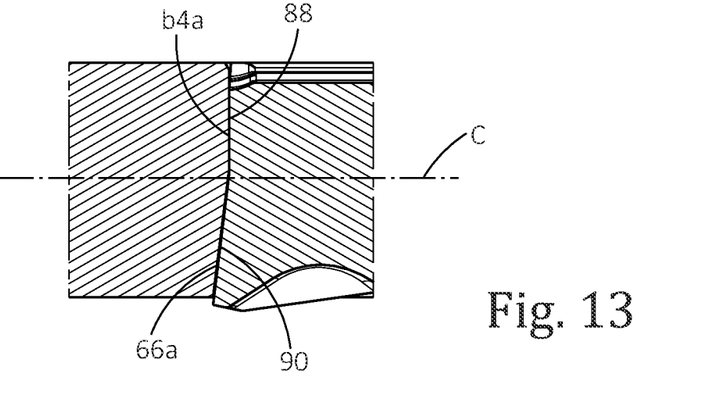
FIG. 13 is a cross section view of the cutting tool taken along the line XIII-XIII shown in FIG. 12.
Figure 14:
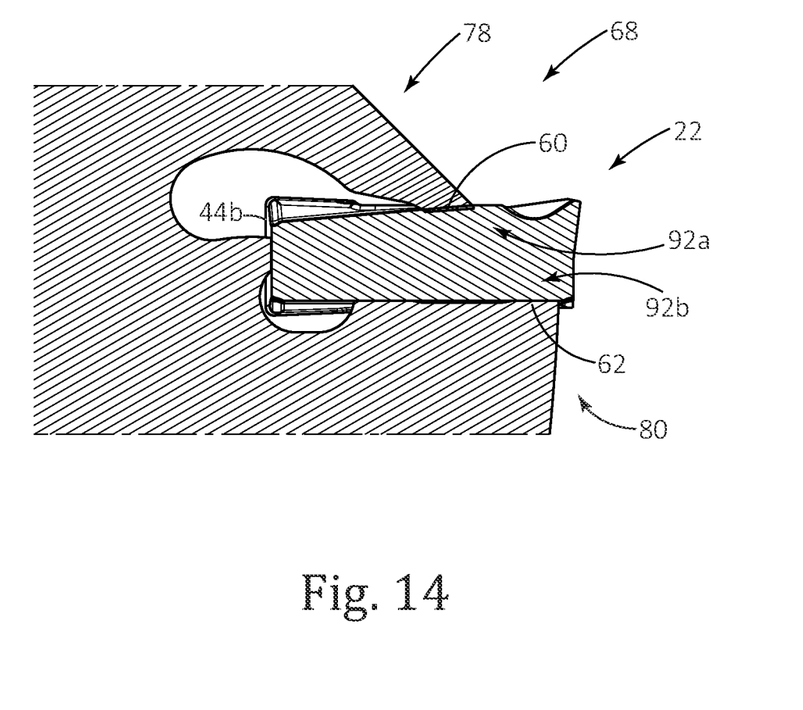
FIG. 14 is a cross section view of the cutting tool taken along the line XIV-XIV shown in FIG. 10, when the cutting tool is in a fastened position.

The seating and support of the cutting insert 22 in the insert receiving slot 26 will be described with reference to FIGS. 1, 12-14. In the fastened position of the cutting tool 20, the cutting insert 22 is releasably attached to the insert holder 24 in a first indexable position. The cutting insert 22 is located in the insert receiving slot 26 and resiliently clamped therein by the upper clamping jaw 78. The first cutting edge 44*a* is operational and the second cutting edge 44*b* is non-operational. In accordance with some embodiments of the subject matter of the present application, in the fastened position of the cutting tool 20, the rake groove abutment surfaces 60 of the first rake engagement groove 48*a* can abut the upper slot engagement ridge 92*a*. Specifically, the rake groove abutment surfaces 60 of the first rake engagement groove 48*a* can abut the two ridge flank abutment edges 98 of the upper slot engagement ridge 92*a*. As shown in FIG. 14, showing a cross section view of the cutting tool 20 taken in a plane parallel to the slot bisector plane B and interesting the one of the ridge flank abutment edges 98, the rake groove abutment surfaces 60 of the first rake engagement groove 48*a* can be located closer to the first cutting edge 44*a* than to the second cutting edge 44*b*. Such a configuration improves fixation of the cutting insert 22 in the insert receiving slot 26. The support groove abutment surfaces 62 of the first support engagement groove 50*a* can abut the lower slot engagement ridge 92*b*. Specifically, the support groove abutment surfaces 62 of the first support engagement groove 50*a* can abut the lower slot engagement ridge 92*b*. The rake groove abutment surfaces 60 and the support groove abutment surfaces 62 of the second support engagement groove 50*b* may not abut any surfaces (e.g., the slot peripheral wall surface 76) of the insert receiving slot 26. The slot rear stopper surface 88 can abut the first insert stopper surface 64*a*. The slot rear recessed surface 90 can be spaced apart from the first insert stopper surface 64*a*. The second insert stopper surface 64*b* may not abut any surfaces the insert receiving slot 26.

It is understood that the cutting insert 22 has a second indexable position, where the cutting insert 22 is rotated 90° about the insert longitudinal axis A and then further rotated 180° about the first insert central axis C1. In such a configuration, in the fastened position of the cutting tool 20, the second cutting edge 44*b* is operational and the first cutting edge 44*a* is non-operational. The rake groove abutment surfaces 60 of the second rake engagement groove 48*b* can abut the upper slot engagement ridge 92*a*. The support groove abutment surfaces 62 of the second support engagement groove 50*b* can abut the lower slot engagement ridge 92*b*. The rake groove abutment surfaces 60 and the support groove abutment surfaces 62 of the first support engagement groove 50*a* may not abut any surfaces of the insert receiving slot 26. The slot rear stopper surface 88 can abut the second insert stopper surface 64*b*. The slot rear recessed surface 90 can be spaced apart from the second insert stopper surface 64*b*. The first insert stopper surface 64*a* may not abut any surfaces of the insert receiving slot 26.

Although the subject matter of the present application has been described to a certain degree of particularity, it should be understood that various alterations and modifications could be made without departing from the spirit or scope of the invention as hereinafter claimed.

What is claimed is:

1. A double-ended cutting insert (22) comprising:
    opposing first and second relief face surfaces (28*a*, 28*b*) and an insert peripheral surface (30) extending therebetween about an insert longitudinal axis (A), the insert peripheral surface (30) comprising a first rake face surface (34*a*) and an opposing first support face surface (36*a*), and a second rake face surface (34*b*) and an opposing second support face surface (36*b*), which all connect the first and second relief face surfaces (28*a*, 28*b*);
    a first insert central axis (C1) oriented perpendicular to the insert longitudinal axis (A) and extending through the first rake face surface (34*a*) and the first support face surface (36*a*);
    a second insert central axis (C2) oriented perpendicular to both the first insert central axis (C1) and the insert longitudinal axis (A), and extending through the second rake face surface (34*b*) and the second support face surface (36*b*);
    a first cutting edge (44*a*) formed at an intersection of the first relief face surface (28*a*) and the first rake face surface (34*a*);
    a second cutting edge (44*b*) formed at an intersection of the second relief face surface (28*b*) and the second rake face surface (34*b*);
    a first rake engagement groove (48*a*) recessed in the first rake face surface (34*a*) and extending along a first rake longitudinal axis (RG1), the first rake engagement groove (48*a*) opening out to the second relief face surface (28*b*) and being spaced apart from both the second rake face surface (34*b*) and the second support face surface (36*b*);
    a first support engagement groove (50*a*) recessed in the first support face surface (36*a*) and extending along a first support groove longitudinal axis (SG1), the first support engagement groove (50*a*) opening out to the second relief face surface (28*b*) and being spaced apart from both the second rake face surface (34*b*) and the second support face surface (36*b*);
    a second rake engagement groove (48*b*) recessed in the second rake face surface (34*b*) and extending along a second rake longitudinal axis (RG2), the second rake engagement groove (48*b*) opening out to the first relief face surface (28*a*) and being spaced apart from both the first rake face surface (34*a*) and the first support face surface (36*a*);
    a second support engagement groove (50*b*) recessed in the second support face surface (36*b*) and extending along a second support groove longitudinal axis (SG2); the second support engagement groove (50*b*) opening out to the first relief face surface (28*a*) and being spaced apart from both the first rake face surface (34*a*) and the first support face surface (36*a*);
    wherein:
    the first rake longitudinal axis (RG1) and the first support engagement groove longitudinal axis (SG1) converge towards each other in a direction from the first relief face surface (28*a*) towards the second relief face surface (28*b*), thereby defining an acute first groove wedge angle ($\theta 1$); and
    the second rake longitudinal axis (RG2) and the second support engagement groove longitudinal axis (SG2) converge towards each other in a direction from the second relief face surface (28*b*) towards the first relief face surface (28*a*), thereby defining an acute second groove wedge angle ($\theta 2$).

2. The cutting insert (22), according to claim 1, wherein:
    the first and second support face surfaces (36*a*, 36*b*) are identical to each other;
    the first and second rake face surfaces (34*a*, 34*b*) are identical to each other; and
    the first and second relief face surfaces (28*a*, 28*b*) are identical to each other.

3. The cutting insert (22), according to claim 1, wherein:
    the first relief face surface (28*a*) comprises a first insert stopper surface (64*a*) and a first relief surface (66*a*) which are oriented differently to each other, the first relief surface (66*a*) extending from the first cutting edge (44*a*) towards the first insert stopper surface (64*a*); and
    the second relief face surface (28*b*) comprises a second insert stopper surface (64*b*) and a second relief surface (66*b*) which are oriented differently to each other, the second relief surface (66*b*) extending from the second cutting edge (44*b*) towards the second insert stopper surface (64*b*).

4. The cutting insert (22), according to claim 3, wherein the first and second insert stopper surfaces (64*a*, 64*b*) are planar and oriented perpendicular to the insert longitudinal axis (A).

5. The cutting insert (22), according to claim 3, wherein:
    in a first side view of the cutting insert along the second insert central axis (C2), the first relief surface (66*a*)

slopes from the first cutting edge (44a) inwardly and downwardly towards the insert longitudinal axis (A); and in a second side view of the cutting insert along the first insert central axis (C1), the second relief surface (66b) slopes from the second cutting edge (44b) inwardly and downwardly towards the insert longitudinal axis (A).

6. The cutting insert (22), according to claim 1, wherein the first and second rake engagement grooves (48a, 48b) overlap in a direction along the insert longitudinal axis (A).

7. The cutting insert (22), according to claim 1, wherein:
one of the first rake and support groove longitudinal axes (RG1, SG1) is parallel to the insert longitudinal axis (A); and
one of the second rake and support groove longitudinal axes (RG2, SG2) is parallel to the insert longitudinal axis (A).

8. The cutting insert (22), according to claim 7, wherein:
the first support groove longitudinal axis (SG1) is parallel to the insert longitudinal axis (A); and
the second support groove longitudinal axis (SG2) is parallel to the insert longitudinal axis (A).

9. The cutting insert (22), according to claim 1, wherein:
the first rake engagement groove (48a) has a first rake groove depth (GD1) which increases in a direction away from the first relief face surface (28a); and
the second rake engagement groove (48b) has a second rake groove depth (GD2) which increases in a direction away from the second relief face surface (28b).

10. The cutting insert (22), according to claim 1, wherein:
the first rake engagement groove (48a) has a first rake groove width (GW1) which increases in a direction away from the first relief face surface (28a); and
the second rake engagement groove (48b) has a second rake groove width (GW2) which increases in a direction away from the second relief face surface (28b).

11. The cutting insert (22), according to claim 1, wherein:
along the insert longitudinal axis (A), the first and second rake engagement grooves (48a, 48b) are spaced apart from the first and second relief face surfaces (28a, 28b), respectively; and
the first and second support engagement grooves (50a, 50b) open out to the first and second relief face surfaces (28a, 28b), respectively.

12. The cutting insert (22), according to claim 1, wherein:
the first and second rake engagement grooves (48a, 48b) each comprise two opposing rake groove flank surfaces (52) which slope inwardly in opposite widthwise directions of the respective rake engagement groove (48a, 48b), so that they converge towards each other; and
the first and second support engagement grooves (50a, 50b) each comprise two opposing support groove flank surfaces (56) which slope inwardly in opposite widthwise directions of the respective support engagement groove (50a, 50b), so that they converge towards each other.

13. The cutting insert (22), according to claim 12, wherein:
each rake groove flank surface (52) comprises a respective rake groove abutment surface (60), at least a portion of each rake groove abutment surface (60) being planar; and
in a cross-sectional view taken in a plane perpendicular to the insert longitudinal axis (A), the rake groove abutment surfaces (60) define an external rake groove flank angle (α);

each support groove flank surface (56) comprises a respective support groove abutment surface (62), at least a portion of each support groove abutment surface (62) being planar; and
in a cross-sectional view taken in a plane perpendicular to the insert longitudinal axis (A), the support groove abutment surfaces (62) define an external support groove flank angle (β).

14. The cutting insert (22), according to claim 12, wherein:
in each of the first and second rake engagement grooves (48a, 48b), the two opposing rake groove flank surfaces (52) transition into each other via a rake groove transition portion (54);
in each of the first and second support engagement grooves (50a, 50b), the two opposing support groove flank surfaces (56) transition into each other via a support groove transition portion (58);
the rake and support groove transition portions (54, 58) of the first rake and support engagement grooves (48a, 50a), respectively, are intersected by a first insert bisector plane (B1) containing the insert longitudinal axis (A) and the first insert central axis (C1); and
the rake and support groove transition portions (54, 58) of the second rake and support engagement grooves (48b, 50b), respectively, are intersected by a second insert bisector plane (B2) containing the insert longitudinal axis (A) and the second insert central axis (C2).

15. The cutting insert (22), according to claim 1, wherein the cutting insert (22) is devoid of a through-hole.

16. The cutting insert (22), according to claim 1, wherein:
the first support engagement groove (50a) is intersected by a first insert bisector plane (B1) containing the insert longitudinal axis (A) and the first insert central axis (C1);
the second support engagement groove (50b) is intersected by a second insert bisector plane (B2) containing the insert longitudinal axis (A) and the second insert central axis (C2);
for at least one-half its length, the first support engagement groove (50a) is mirror symmetric about the first bisector plane (B1); and
for at least one-half its length, the second support engagement groove (50b) is mirror symmetric about the second bisector plane (B2).

17. The cutting insert (22), according to claim 16, wherein:
for its entire length, the first support engagement groove (50a) includes two support groove flank surfaces (56) on opposite sides of the first bisector plane (B1) that are mirror symmetric about the first bisector plane (B1); and
for its entire length, the second support engagement groove (50b) includes two support groove flank surfaces (56) on opposite sides of the second bisector plane (B2) that are mirror symmetric about the second bisector plane (B2).

18. A double-ended cutting insert (22) comprising:
opposing first and second relief face surfaces (28a, 28b) and an insert peripheral surface (30) extending therebetween about an insert longitudinal axis (A), the insert peripheral surface (30) comprising a first rake face surface (34a) and an opposing first support face surface (36a), and a second rake face surface (34b) and an opposing second support face surface (36b), which all connect the first and second relief face surfaces (28a, 28b);

a first insert central axis (C1) oriented perpendicular to the insert longitudinal axis (A) and extending through the first rake face surface (34a) and the first support face surface (36a);

a second insert central axis (C2) oriented perpendicular to both the first insert central axis (C1) and the insert longitudinal axis (A), and extending through the second rake face surface (34b) and the second support face surface (36b);

a first cutting edge (44a) formed at an intersection of the first relief face surface (28a) and the first rake face surface (34a);

a second cutting edge (44b) formed at an intersection of the second relief face surface (28b) and the second rake face surface (34b);

a first rake engagement groove (48a) recessed in the first rake face surface (34a) and extending along a first rake longitudinal axis (RG1), the first rake engagement groove (48a) opening out to the second relief face surface (28b);

a first support engagement groove (50a) recessed in the first support face surface (36a) and extending along a first support groove longitudinal axis (SG1), the first support engagement groove (50a) opening out to the second relief face surface (28b);

a second rake engagement groove (48b) recessed in the second rake face surface (34b) and extending along a second rake longitudinal axis (RG2), the second rake engagement groove (48b) opening out to the first relief face surface (28a);

a second support engagement groove (50b) recessed in the second support face surface (36b) and extending along a second support groove longitudinal axis (SG2); the second support engagement groove (50b) opening out to the first relief face surface (28a);

wherein:

the first rake longitudinal axis (RG1) and the first support engagement groove longitudinal axis (SG1) converge towards each other in a direction from the first relief face surface (28a) towards the second relief face surface (28b), thereby defining an acute first groove wedge angle ($\theta 1$);

the second rake longitudinal axis (RG2) and the second support engagement groove longitudinal axis (SG2) converge towards each other in a direction from the second relief face surface (28b) towards the first relief face surface (28a), thereby defining an acute second groove wedge angle ($\theta 2$);

the first support engagement groove (50a) is intersected by a first insert bisector plane (B1) containing the insert longitudinal axis (A) and the first insert central axis (C1);

the second support engagement groove (50b) is intersected by a second insert bisector plane (B2) containing the insert longitudinal axis (A) and the second insert central axis (C2);

for at least one-half its length, the first support engagement groove (50a) is mirror symmetric about the first bisector plane (B1); and for at least one-half its length, the second support engagement groove (50b) is mirror symmetric about the second bisector plane (B2).

19. The cutting insert (22), according to claim 18, wherein:

for its entire length, the first support engagement groove (50a) includes two support groove flank surfaces (56) on opposite sides of the first bisector plane (B1) that are mirror symmetric about the first bisector plane (B1); and for its entire length, the second support engagement groove (50b) includes two support groove flank surfaces (56) on opposite sides of the second bisector plane (B2) that are mirror symmetric about the second bisector plane (B2).

* * * * *